(12) United States Patent
Endicott et al.

(10) Patent No.: US 6,178,075 B1
(45) Date of Patent: Jan. 23, 2001

(54) ELECTRONIC MODULE WITH MOISTURE PROTECTION

(75) Inventors: Mark Andrew Glinka Endicott, Ann Arbor; Vincent Colarossi, Dearborn Heights; Viren Babubhai Merchant, Canton, all of MI (US)

(73) Assignee: Visteon Global Technologies, Inc., Dearborn, MI (US)

( * ) Notice: Under 35 U.S.C. 154(b), the term of this patent shall be extended for 0 days.

(21) Appl. No.: 09/325,912

(22) Filed: Jun. 4, 1999

(51) Int. Cl.[7] ....................................................... H02H 9/00
(52) U.S. Cl. .......................... 361/54; 361/104; 361/93.8; 361/78; 361/57
(58) Field of Search .................................. 361/104, 93.8, 361/78, 54, 57; 307/10.1

(56) References Cited

U.S. PATENT DOCUMENTS

| | | |
|---|---|---|
| 3,668,483 | 6/1972 | Kellenbenz . |
| 4,038,584 | 7/1977 | Tarchalski et al. . |
| 4,280,161 | 7/1981 | Kuhn et al. . |
| 4,351,014 | 9/1982 | Schofield, Jr. . |
| 4,354,217 | 10/1982 | Mahon . |
| 4,439,801 | 3/1984 | Fajt . |
| 4,494,164 | 1/1985 | Noel . |
| 4,530,023 | 7/1985 | Brown . |
| 4,589,047 | 5/1986 | Gaüs et al. . |
| 4,626,952 | 12/1986 | Morikawa . |
| 4,791,519 | 12/1988 | Madsen . |
| 4,796,658 | 1/1989 | Caple . |
| 4,860,154 | 8/1989 | Fazlollahi . |
| 4,888,535 | * 12/1989 | Brusasco ........................... 318/568.1 |
| 4,977,477 | 12/1990 | Babico et al. . |
| 5,321,345 | * 6/1994 | Lambros et al. ..................... 318/483 |
| 5,483,406 | 1/1996 | Bennett et al. . |
| 5,485,342 | 1/1996 | Sugino et al. . |
| 5,751,071 | * 5/1998 | Netzer ................................. 307/10.1 |

* cited by examiner

Primary Examiner—Michael J. Sherry
(74) Attorney, Agent, or Firm—Rhonda L. McCoy-Pfau

(57) ABSTRACT

An electronic module comprising a power supply conductor coupled to one or more electromechanical actuators to supply operable power to the electromechanical actuators. The electronic module also includes a moisture sensor positioned to sense moisture intrusion into the module. Further, the electronic module comprises a first transistor responsively coupled to the moisture sensor, the first transistor coupled to draw current from the power supply conductor when the first transistor is in a conductive state. In addition, the electronic module includes a second transistor responsively coupled to the first transistor and in turn controllingly coupled to the first transistor.

15 Claims, 2 Drawing Sheets

ELECTRONIC MODULE WITH MOISTURE PROTECTION

BACKGROUND OF THE INVENTION

1. Field of the Invention

The present invention relates to moisture protection circuitry for electronic systems.

2. Description of the Related Art

Electronic control of electromechanical actuators is common. In some applications, there is the potential for the control electronics to become wet to due moisture intrusion from the surrounding environment. Such moisture intrusion may cause the control electronics to inadvertently actuate the actuators they control, due to unintended conductivity in various parts of the circuitry caused by the intruding moisture.

In motor vehicles, electronic control of power seats is becoming increasingly common, in order to provide features such as "memory" power seats. The most efficient place to package the control module for the power seats is frequently beneath the seats themselves. However, the floor of a motor vehicle can occasionally get wet. Intrusion of moisture into the control module, and the possibility that the moisture intrusion will cause the control electronics to inadvertently move the power seats, is thus an issue.

Therefore, in the motor vehicle power seat environment and in other environments as well, a system which will prevent inadvertent actuation due to moisture intrusion into control electronics will prove advantageous.

SUMMARY OF THE INVENTION

The present invention provides an electronic module comprising a power supply conductor coupled to one or more electromechanical actuators to supply operable power to the electromechanical actuators. The electronic module also includes a moisture sensor positioned to sense moisture intrusion into the module. Further, the electronic module comprises a first transistor responsively coupled to the moisture sensor, the first transistor coupled to draw current from the power supply conductor when the first transistor is in a conductive state. In addition, the electronic module includes a second transistor responsively coupled to the first transistor and in turn controllingly coupled to the first transistor.

By providing moisture protection which can prevent inadvertent actuation of electromechanical actuators controlled by electronic control circuitry, the present invention provides advantages over alternative systems.

DETAILED DESCRIPTION OF THE PREFERRED EMBODIMENT

Figure 1:
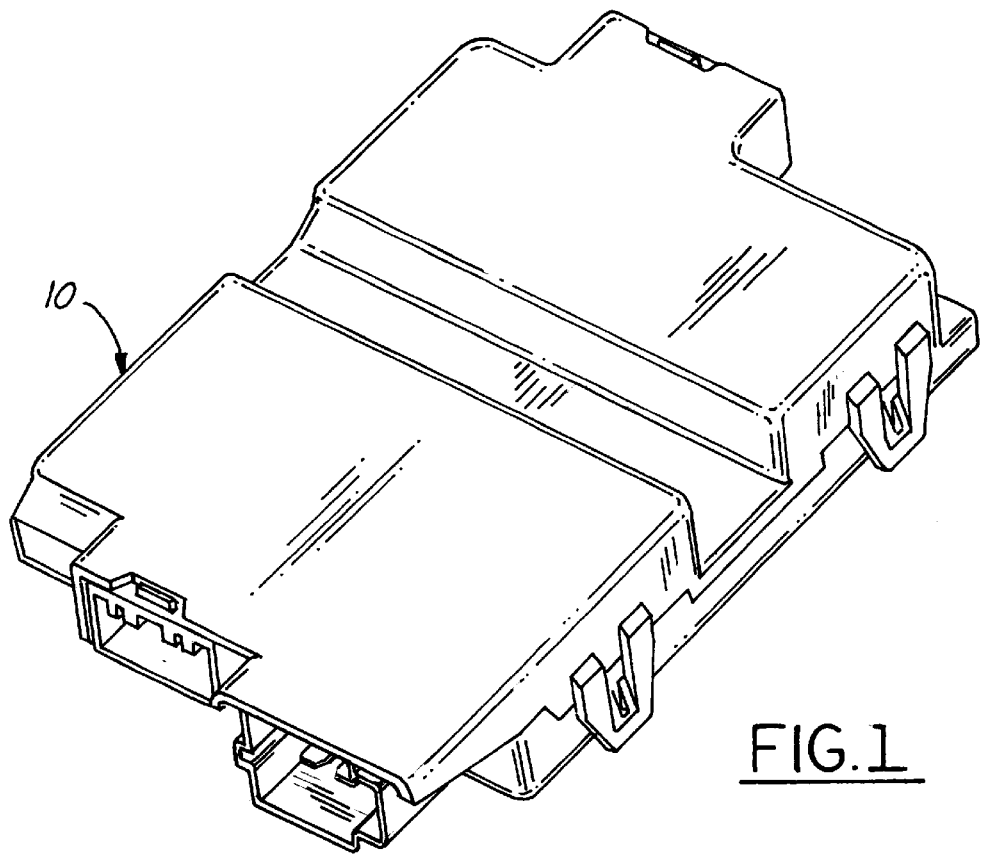
FIG. 1 is a perspective view of a power seat control module 10.

Refer first to FIG. 1. Illustrated there is a control module 10 for a power seat system of a motor vehicle. Such a module takes inputs from various control switches and seat position sensors and drives the motors which position the power seats. Frequently, it is desirable to package control module 10 under a seat in the motor vehicle, for maximum packaging efficiency. Control module 10 preferably has a molded plastic housing within which is housed a circuit board containing the control circuitry which controls the power seat motors.

Figure 2:
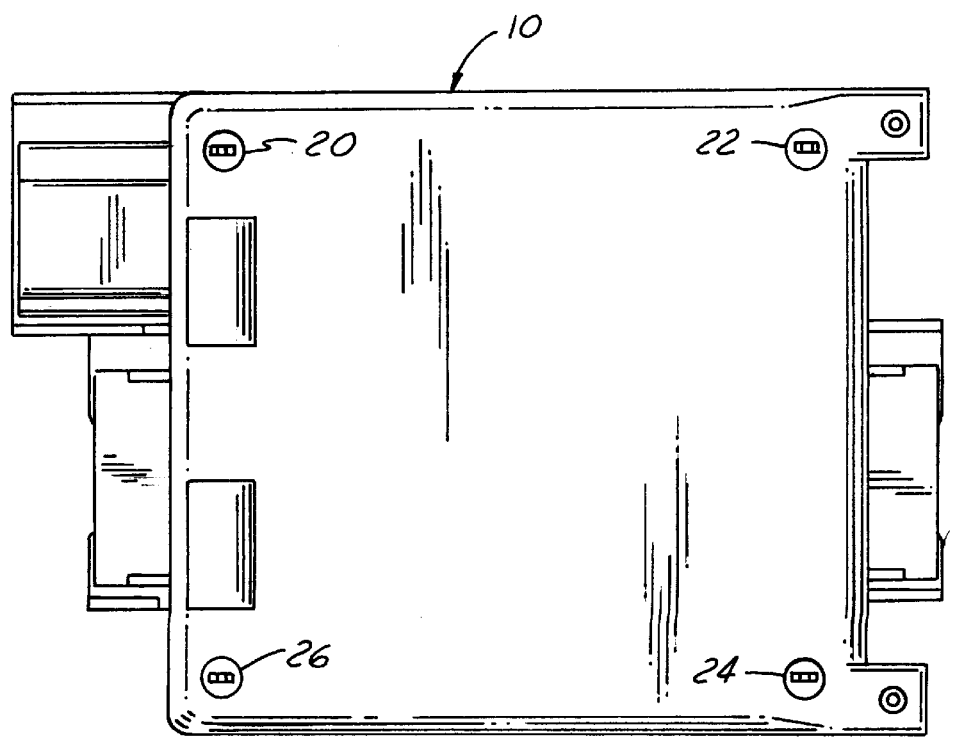
FIG. 2 is a bottom view of control module 10 of FIG. 1.
Figure 2A:
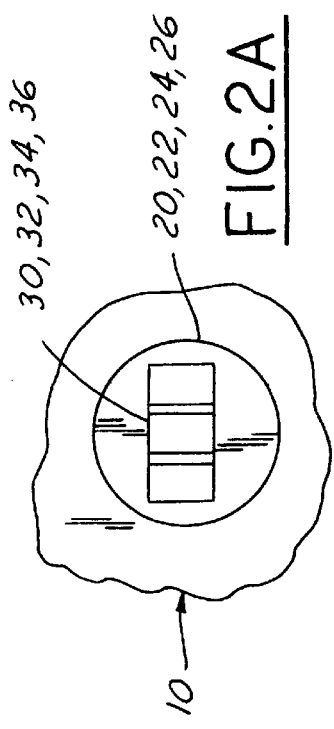
FIG. 2A is an enlarged view of the area labelled "2A" in FIG. 2.

Several holes 20, 22, 24 and 26 are provided in the bottom of the housing of control module 10 (see FIGS. 2 and 2A). Holes 20, 22, 24 and 26 are located directly opposite capacitors 30, 32, 34 and 36, which are located on the circuit board within control module 10.

Figure 3:
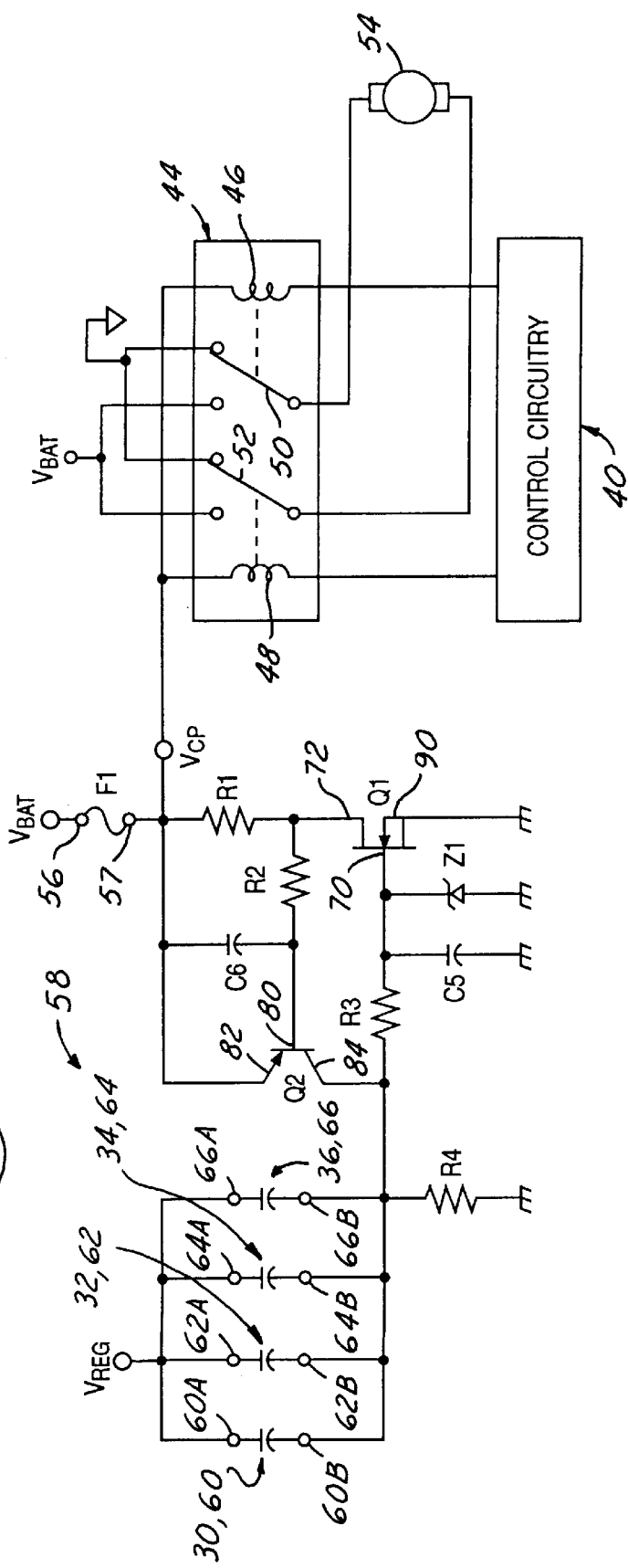
FIG. 3 is a schematic of the electrical components within control module 10.

Refer now additionally to FIG. 3 for a description of the circuitry within control module 10. The circuitry includes control circuitry 40 which performs control of the power seat motors. Control circuitry 40 preferably includes a microprocessor. Control circuitry 40 controls one or more relays 44 via control of relay coils 46 and 48. Relay contacts 50 and 52 are coupled to a power seat motor 54 to effect bi-directional control of power seat motor 54. Additional relays and power seat motors are also controlled by control circuitry 40 as appropriate.

Power for relay coils 46 and 48 is designated $V_{CP}$ in FIG. 3. $V_{CP}$ is provided via a fuse F1 from $V_{BAT}$, the battery voltage in the vehicle. Fuse F1 is included in a fuse holder having terminals 56 and 57.

Control module 10 also includes moisture protection circuitry 58. Moisture protection circuitry 58 includes a plurality of moisture sensing locations 60, 62, 64 and 66, which are located on the circuit board within control module 10. (Preferably, the circuitry of FIG. 3 is of "surface mount" technology.) Each moisture sensing location includes two solder pads (for example, solder pads 60A and 60B of moisture sensing location 60). Also, for noise immunity, each moisture sensing location includes a capacitor coupled across its solder pads (for example, capacitor 30 coupled across solder pads 60A and 60B). It is noted that any insulating coating which may be applied to the circuit board is not applied to solder pads 60A, 60B, 62A, 62B, 64A, 64B, 66A and 66B; it is through these that moisture intrusion into control module 10 is sensed.

Moisture sensing locations 60, 62, 64, 66 are coupled to a pull-down resistor R4 and an R-C low-pass filter comprising resistor R3 and capacitor C5. The output of this filter is coupled to gate 70 of field-effect transistor (FET) Q1. Drain 72 of Q1 is coupled via a resistor R1 to fuse F1. FET Q1 and resistor R1 are selected such that when FET Q1 is fully "ON" (that is, fully "enhanced"), the current drawn through resistor R1 and FET Q1 is sufficient to "blow" fuse F1.

Drain 72 of FET Q1 is also coupled, via resistor R2, to the base 80 of p-n-p bipolar transistor Q2. Emitter 82 of transistor Q2 is coupled to $V_{CP}$, and collector 84 of transistor Q2 is coupled to the outputs of moisture sensing locations 60, 62, 64 and 66. Capacitor C6, along with resistor R2, form a low-pass filter which improves the noise immunity of the response of transistor Q2 to actuation of FET Q1.

Zener diode Z1 is provided to protect gate 70 of FET Q1 from voltage transients which may exist, for example, in an automotive environment.

The moisture protection circuitry 58 of FIG. 3 operates as follows. If sensing locations 60, 62, 64 and 66 become sufficiently dampened by moisture, the conductivity between their respective solder pads (e.g., solder pads 60A and 60B of moisture sensing location 60) increases. The voltage across pull-down resistor R4 thus increases as well, increasing the voltage at gate 70 of FET Q1. With a sufficient voltage rise at gate 70, the resistance between drain 72 and source 90 of FET Q1 will decrease, causing significant current to flow through resistor R1. If the voltage at gate 70 of FET Q1 is large enough, the current flowing through R1 will be large enough to cause fuse F1 to "blow". Power for coils 46 and 48 of relay 44 (and coils of other relays also controlled by control module 10) will thus be removed. Inadvertent operation of power seat motor 54 due to moisture infiltration into control circuitry 40 of control module 10 will thus be prevented.

Transistor Q2 has two major purposes. First, if the voltage at gate 70 of FET Q1 has risen only to the point that FET Q1 is only marginally conductive enough to blow fuse F1, transistor Q2 will ensure that the gate voltage of FET Q1 rises enough to blow fuse F1. This is accomplished because, with a modest current flowing through resistor R1, the emitter-base junction of transistor Q2 will become forward biased. This will cause current to flow from emitter to collector of transistor Q2, increasing the gate voltage of FET Q1. This positive feedback, wherein FET Q1 beginning to turn "ON" turns "ON" transistor Q2, which in turn more fully turns FET Q1 "ON", ensures that fuse F1 will blow when moisture is sensed by moisture-sensing locations 60, 62, 64 and 66.

The second function of transistor Q2 is to ensure that the voltage $V_{CP}$ is held low even if conductivity between terminals 56 and 57 exists after fuse F1 is "blown". It has been observed that in the presence of fluids with relatively substantial conductivity, such as salt water, significant current can flow between terminals 56 and 57 even after F1 has blown. Such current may even be sufficient enough to power coils 46 and 48 of relay 44. However, if $V_{CP}$ remains at a significant voltage even after fuse F1 has blown, the emitter-base junction of transistor Q2 will remain forward biased. Transistor Q2 will thus continue to conduct, ensuring that FET Q1 has sufficient gate voltage to heavily load $V_{CP}$, which would have a very high source impedance. Under these circumstances, $V_{CP}$ would not be sufficient to power coils 46 and 48 of relay 44.

Two other design considerations should be noted. First, several components (most notably resistors R4 and R1 and FET Q1) can be selected to adjust the sensitivity of moisture protection circuitry 58 as appropriate. Second, Q1's selection as an FET, as opposed to a different type of semiconductor device, is advantageous because the typical failure mode of FETs due to thermal failure is to fail conductive. That is, if FET Q1 fails due to thermal "overload", it will tend to continue drawing current through resistor R1. This will provide continue to load down $V_{CP}$, providing a "fail safe" situation.

Various other modifications and variations will no doubt occur to those skilled in the arts to which this invention pertains. Such variations which generally rely on the teachings through which this disclosure has advanced the art are properly considered within the scope of this invention. This disclosure should thus be considered illustrative, not limiting; the scope of the invention is instead defined by the following claims.

What is claimed is:

1. An electronic module comprising:
   a power supply conductor coupled to one or more electromechanical actuators to supply operable power to said electromechanical actuators;
   a moisture sensor positioned to sense moisture intrusion into said module;
   a first transistor responsively coupled to said moisture sensor, said first transistor coupled to draw current from said power supply conductor when said first transistor is in a conductive state;
   a second transistor responsively coupled to said first transistor and in turn controllingly coupled to said first transistor.

2. An electronic module as recited in claim 1, wherein:
   said electronic module includes a circuit board; and
   said moisture sensor comprises two conductors spaced apart from one another on said circuit board.

3. An electronic module as recited in claim 2, wherein:
   said electronic module includes a housing in which said circuit board is disposed; and
   said housing includes an opening disposed adjacent said moisture sensor.

4. An electronic module as recited in claim 1, wherein:
   said electronic module includes an overcurrent protection device through which electrical power is supplied to said power supply conductor;
   said first transistor has sufficient current conduction capability to cause said overcurrent protection device to open.

5. An electronic module as recited in claim 4, wherein said overcurrent protection device is a fuse.

6. An electronic module as recited in claim 1, wherein said first transistor is a field-effect transistor (FET).

7. An electronic module as recited in claim 6, wherein said FET has a drain terminal coupled via a resistor to said power supply conductor, said FET and said resistor being selected such that when said FET is fully conductive, said FET causes current flow through said overcurrent protection device sufficient to open said overcurrent protection device.

8. An electronic module as recited in claim 7, wherein:
   said second transistor is a bipolar transistor;
   said bipolar transistor has a base and an emitter which together define a base-emitter junction; and
   said resistor is coupled substantially across said base-emitter junction.

9. An electronic module as recited in claim 8, wherein said emitter is coupled to said power supply conductor.

10. An electronic module comprising:
    a power supply conductor coupled to one or more electromechanical actuators to supply operable power to said electromechanical actuators;
    at least one moisture sensor positioned to sense moisture intrusion into said module;
    a field-effect transistor (FET) having a drain terminal coupled to said power supply conductor, and further having a gate terminal; and
    a transistor having a control input terminal responsively coupled in electrical communication with said drain terminal and having an output terminal controllingly coupled in electrical communication with said gate terminal.

11. An electronic module as recited in claim 10, wherein:
    said power supply conductor is supplied electrical power through an overcurrent protection device;
    said coupling of said drain terminal to said power supply terminal is via a resistor; and
    said FET and said resistor are selected such than when said FET is fully conductive, it will draw current sufficient to open said overcurrent protection device.

12. An electronic module as recited in claim 11, wherein:
    said transistor is a bipolar transistor; and
    said resistor is coupled substantially across a base-emitter junction of said transistor.

13. An electronic module as recited in claim 12, wherein said overcurrent protection device is a fuse.

14. An electronic module as recited in claim 10, wherein:

said transistor is a bipolar transistor;

said coupling of said drain terminal to said power supply terminal is via a resistor; and said resistor is coupled substantially across a base-emitter junction of said transistor.

15. An electronic module as recited in claim 11, wherein said overcurrent protection device is a fuse.

* * * * *